United States Patent
Wang et al.

(10) Patent No.: US 12,223,571 B2
(45) Date of Patent: Feb. 11, 2025

(54) DATA TRANSMISSION METHOD AND RELATED DEVICE FOR VIRTUAL REALITY SYSTEM

(71) Applicants: Beijing BOE Optoelectronics Technology Co., Ltd., Beijing (CN); BOE TECHNOLOGY GROUP CO., LTD., Beijing (CN)

(72) Inventors: Xuefeng Wang, Beijing (CN); Wenyu Li, Beijing (CN); Jinghua Miao, Beijing (CN); Xi Li, Beijing (CN); Longhui Wang, Beijing (CN); Zihe Liu, Beijing (CN); Lili Chen, Beijing (CN); Hao Zhang, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 151 days.

(21) Appl. No.: 17/921,292

(22) PCT Filed: Jul. 5, 2021

(86) PCT No.: PCT/CN2021/104473
§ 371 (c)(1),
(2) Date: Oct. 25, 2022

(87) PCT Pub. No.: WO2022/042039
PCT Pub. Date: Mar. 3, 2022

(65) Prior Publication Data
US 2023/0186537 A1 Jun. 15, 2023

(30) Foreign Application Priority Data
Aug. 26, 2020 (CN) .......................... 202010872960.2

(51) Int. Cl.
*G06T 11/60* (2006.01)
*G06F 3/14* (2006.01)
*G06T 3/40* (2006.01)

(52) U.S. Cl.
CPC ................ *G06T 11/60* (2013.01); *G06F 3/14* (2013.01); *G06T 3/40* (2013.01)

(58) Field of Classification Search
CPC ....... G06T 11/60; G06T 3/40; G06T 2210/36; G06T 1/20; G06T 19/006; G06F 3/1454;
(Continued)

(56) References Cited

U.S. PATENT DOCUMENTS

2002/0141614 A1* 10/2002 Lin ........................ H04N 19/17
375/E7.182
2013/0083071 A1 4/2013 Nakamura
(Continued)

FOREIGN PATENT DOCUMENTS

CN 105892061 A 8/2016
CN 106226908 A 12/2016
(Continued)

OTHER PUBLICATIONS

Geisler et al., "A real-time foveated multiresolution system for low-bandwidth video communication," SPIE Proceedings, Jul. 17, 1998, p. 1-13, vol. 3299.
(Continued)

*Primary Examiner* — Xilin Guo
(74) *Attorney, Agent, or Firm* — HOUTTEMAN LAW LLC

(57) ABSTRACT

A data transmission method includes: capturing, by a virtual reality host, a portion of an image to be transmitted in a preset area to obtain a first image, and compressing, by the virtual reality host, a portion of the image to be transmitted in a display area to obtain a second image, wherein the preset area is a portion of the display area (S101); transmitting, by the virtual reality host, the first image and the second image to a virtual reality apparatus in a certain order (S102); receiving the first image and the second image by the virtual reality apparatus (S103); stretching the second image by the virtual reality apparatus, and merging the first image with a stretched second image by the virtual reality apparatus to obtain an image to be displayed (S104); and displaying the image to be displayed by the virtual reality apparatus (S105).

13 Claims, 6 Drawing Sheets

(58) Field of Classification Search
CPC .......... G06F 3/14; G06F 3/011; G06F 3/0481;
G06F 3/012; G09G 2340/12; G09G
2340/10; G09G 2340/04; G09G
2340/0407; G09G 2354/00; G09G
2340/0428; G09G 2310/04
See application file for complete search history.

(56) References Cited

U.S. PATENT DOCUMENTS

| | | | |
|---|---|---|---|
| 2018/0356886 A1 | 12/2018 | Li | |
| 2021/0278678 A1* | 9/2021 | Brannan | G02B 27/0093 |
| 2022/0232269 A1* | 7/2022 | Ninan | H04N 21/2353 |

FOREIGN PATENT DOCUMENTS

| | | |
|---|---|---|
| CN | 107065197 A | 8/2017 |
| CN | 107317987 A | 11/2017 |
| CN | 110913198 A | 3/2020 |
| CN | 110913199 A | 3/2020 |
| CN | 112015273 A | 12/2020 |

OTHER PUBLICATIONS

Vinnikov et al., "Gaze-Contingent Auditory Displays for Improved Spatial Attention in Virtual Reality," ACM Transactions on Computer-Human Interaction, Apr. 2017, p. 19:1 to 19:38, vol. 24, No. 3.
Wang, Shulu, "Research on three-dimensional display based on human visual specialties, " Doctoral Dissertation, Oct. 8, 2016, Univ. of Science & Technology of China, Hefei, Anhui Province, China. English Abstract.

* cited by examiner

DATA TRANSMISSION METHOD AND RELATED DEVICE FOR VIRTUAL REALITY SYSTEM

CROSS-REFERENCE TO RELATED APPLICATIONS

This is a National Phase Application filed under 35 U.S.C. 371 as a national stage of PCT/CN2021/104473 filed on Jul. 5, 2021, an application claiming priority to Chinese patent application No. 202010872960.2, entitled "data transmission method and related device for virtual reality system" and filed in the Chinese patent office on Aug. 26, 2020, the entire content of each of which is incorporated herein by reference.

TECHNICAL FIELD

The present disclosure relates to field of display technology, and in particular, to a data transmission method and a related device for a virtual reality system.

BACKGROUND

Virtual Reality (VR) technology is an emerging field of technology in recent years. VR display belongs to a near-eye display (or near-to-eye display) field. In order to prevent a user from experiencing a screen door effect and allow the user to achieve an immersive experience, it is required that a VR display screen has a high resolution and a high refresh rate, which results in the problem of increased transmission bandwidth of a virtual reality system.

SUMMARY

Embodiments of the present disclosure provide a data transmission method for a virtual reality system, the data transmission method including:
  capturing, by a virtual reality host, a portion of an image to be transmitted in a preset area to obtain a first image, and compressing, by the virtual reality host, a portion of the image to be transmitted in a display area to obtain a second image, wherein the preset area is a portion of the display area;
  transmitting, by the virtual reality host, the first image and the second image to a virtual reality apparatus in a certain order;
  receiving the first image and the second image by the virtual reality apparatus;
  stretching the second image by the virtual reality apparatus, and merging the first image with a stretched second image by the virtual reality apparatus to obtain an image to be displayed; and
  displaying the image to be displayed by the virtual reality apparatus.

Embodiments of the present disclosure further provide a data transmission method for a virtual reality system, the data transmission method including:
  capturing a portion of an image to be transmitted in a preset area to obtain a first image, and compressing a portion of the image to be transmitted in a display area to obtain a second image, wherein the preset area is a portion of the display area; and
  transmitting the first image and the second image to a virtual reality apparatus in a certain order.

Optionally, in an embodiment of the present disclosure, the capturing the portion of the image to be transmitted in the preset area to obtain the first image and the compressing the image to be transmitted to obtain the second image include:
  performing image sampling on the preset area of the image to be transmitted with a preset first resolution, a preset first field angle and a preset first refresh rate to obtain the first image; and
  performing image sampling on the display area of the image to be transmitted with a preset second resolution, a preset second field angle and a preset second refresh rate to obtain the second image;
  wherein the first resolution and the second resolution are equal to each other, the first field angle is less than the second field angle, and the first refresh rate is greater than or equal to the second refresh rate.

Optionally, in an embodiment of the present disclosure, the first refresh rate and the second refresh rate are determined as follows:
  the first refresh rate of the first image and the second refresh rate of the second image are determined according to a refresh rate of the virtual reality apparatus and attitude information of the virtual reality apparatus.

Optionally, in an embodiment of the present disclosure, the transmitting the first image and the second image to the virtual reality apparatus in the certain order includes:
  arranging frames of the first image and the second image according to the first refresh rate and the second refresh rate to obtain an image sequence including the first image and the second image, and transmitting the image sequence to the virtual reality apparatus.

Optionally, in an embodiment of the present disclosure, the capturing the portion of the image to be transmitted in the preset area to obtain the first image, and the compressing the portion of the image to be transmitted in the display area to obtain the second image include:
  adding flag bit information into the first image and the second image, respectively, wherein the flag information is configured to distinguish the first image and the second image from each other.

Embodiments of the present disclosure further provide a data transmission method for a virtual reality system, the data transmission method including:
  receiving a first image and a second image transmitted from a virtual reality host;
  stretching the second image, and merging the first image with a stretched second image to obtain an image to be displayed; and displaying the image to be displayed.

Optionally, in an embodiment of the present disclosure, the receiving the first image and the second image includes:
  receiving the first image and the second image, and distinguishing the first image and the second image from each other according to flag bit information; and
  storing the first image in a first memory, and storing the second image in a second memory.

Optionally, in an embodiment of the present disclosure, the stretching the second image in the image sequence, and the merging the first image in the image sequence with the stretched second image to obtain the image to be displayed include:
  obtaining the first image and the second image from the first memory and the second memory, respectively;
  stretching the second image to make a resolution of the stretched second image equal to a display resolution of the virtual reality apparatus; and
  merging the first image with the stretched second image to obtain the image to be displayed.

Embodiments of the present disclosure further provide a virtual reality host, including:

an image processor configured to capture a portion of an image to be transmitted in a preset area to obtain a first image, and compress a portion of the image to be transmitted in a display area to obtain a second image, wherein the preset area is a portion of the display area; and a transmitter configured to transmit the first image and the second image to the virtual reality apparatus in a certain order.

Optionally, in an embodiment of the present disclosure, the image processor is further configured to: perform image sampling on the preset area of the image to be transmitted with a preset first resolution, a preset first field angle and a preset first refresh rate to obtain the first image; and perform image sampling on the display area of the image to be transmitted with a preset second resolution, a preset second field angle and a preset second refresh rate to obtain the second image; wherein the first resolution and the second resolution are equal to each other, and the first refresh rate is greater than or equal to the second refresh rate.

Optionally, in an embodiment of the present disclosure, the transmitter is further configured to: determine the first refresh rate of the first image and the second refresh rate of the second image according to a refresh rate of the virtual reality apparatus and attitude information of the virtual reality apparatus; arranging frames of the first image and the second image according to the first refresh rate and the second refresh rate to obtain an image sequence including the first image and the second image; and transmit the image sequence to the virtual reality apparatus.

Embodiments of the present disclosure further provide a virtual reality apparatus, including:

a receiver configured to receive a first image and a second image transmitted from a virtual reality host;

an image merger configured to stretch the second image, and merge the first image with a stretched second image to obtain an image to be displayed; and a display configured to display the image to be displayed.

Optionally, in an embodiment of the present disclosure, the receiver is further configured to: receive the first image and the second image, distinguish the first image and the second image from each other according to flag bit information; store the first image in a first memory; and store the second image in a second memory.

Optionally, in an embodiment of the present disclosure, the image merger is further configured to: obtain the first image and the second image from the first memory and the second memory, respectively; stretch the second image to make a resolution of the stretched second image equal to a display resolution of the virtual reality apparatus; and merge the first image with the stretched second image to obtain the image to be displayed.

Embodiments of the present disclosure further provide a virtual reality system, including: any one of the virtual reality hosts described above and any one of the virtual reality apparatuses described above.

DETAILED DESCRIPTION OF EMBODIMENTS

Figure 1:
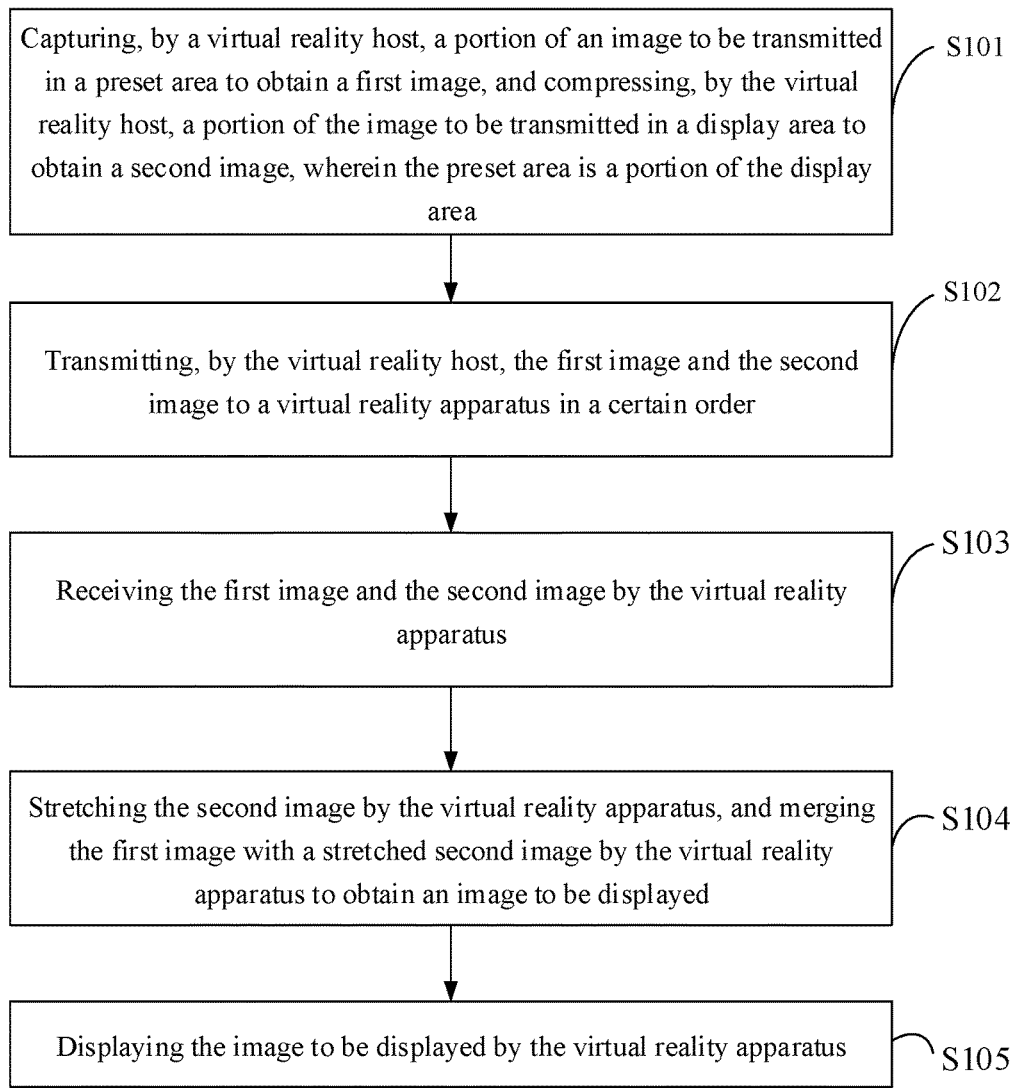
FIG. 1 is a first flowchart of a data transmission method for a virtual reality system according to an embodiment of the present disclosure.

In view of the problem that a transmission bandwidth of a virtual reality system in the related art is large, embodiments of the present disclosure provide a data transmission method and a related device for a virtual reality system.

Exemplary embodiments of the data transmission method and the related device for a virtual reality system according to the embodiments of the present disclosure will be described below in detail with reference to the accompanying drawings. The sizes and shapes of various parts shown in the drawings are not necessary to scale, but are merely for illustrating the present disclosure.

An embodiment of the present disclosure provides a data transmission method for a virtual reality system, as shown in FIG. 1, the data transmission method includes steps S101 to S105.

Step S101 includes capturing (e.g., cutting out), by a virtual reality host, a portion of an image to be transmitted in a preset area to obtain a first image, and compressing, by the virtual reality host, a portion of the image to be transmitted in a display area to obtain a second image, where the preset area is a portion of the display area.

Step S102 includes transmitting, by the virtual reality host, the first image and the second image to a virtual reality apparatus in a certain order.

Step S103 includes receiving the first image and the second image by the virtual reality apparatus.

Step S104 includes, by the virtual reality apparatus, stretching the second image, and merging (or fusing) the first image with the stretched second image to obtain an image to be displayed.

Step S105 includes displaying the image to be displayed by the virtual reality apparatus.

In the data transmission method for the virtual reality system according to the present embodiment, the virtual reality host obtains the first image by capturing the portion of the image to be transmitted in the preset area, obtains the second image by compressing the portion of the image to be transmitted in the display area, and transmits the first image and the second image in the certain order. Since a data amount of the first image and a data amount of the second image are each smaller than a data amount of the image to be transmitted, the transmission bandwidth is greatly reduced. Further, the virtual reality apparatus can stretch the received second image, and merge the stretched second image with the received first image, to obtain the image to be displayed that meets the display requirement of a virtual reality system. As such, the data transmission method according to the present embodiment can greatly reduce the transmission bandwidth and improve the user experience, on the basis of meeting the display requirement of the virtual reality system.

Figure 2:
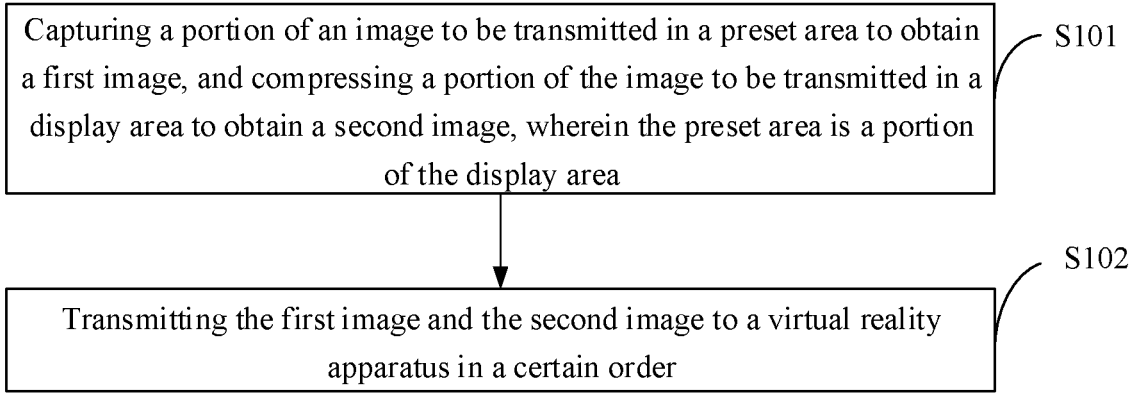
FIG. 2 is a second flowchart of a data transmission method for a virtual reality system according to an embodiment of the present disclosure.

Based on the same inventive concept, an embodiment of the present disclosure further provides a data transmission method for a virtual reality system, as shown in FIG. 2, this data transmission method may include the following steps S101 and S102.

Step S101 includes capturing (e.g., cutting out), by a virtual reality host, a portion of an image to be transmitted in a preset area to obtain a first image, and compressing, by the virtual reality host, a portion of the image to be transmitted in a display area to obtain a second image, where the preset area is a portion of the display area.

Step S102 includes transmitting the first image and the second image to a virtual reality apparatus in a certain order.

In the data transmission method for the virtual reality system according to the present embodiment, a virtual reality host obtains the first image by capturing the portion of the image to be transmitted in the preset area, obtains the second image by compressing the portion of the image to be transmitted in the display area, and transmits the first image and the second image in the certain order. Since a data amount of the first image and a data amount of the second image are each smaller than a data amount of the image to be transmitted, the transmission bandwidth is greatly reduced.

In an embodiment of the present disclosure, the data transmission method shown in FIG. 2 may be executed on a virtual reality host, which may be in communication connection with the virtual reality apparatus in a wired or wireless manner. For example, the virtual reality host may be a computer, a mobile phone, a tablet computer, or another apparatus with a processing function.

Figure 3:
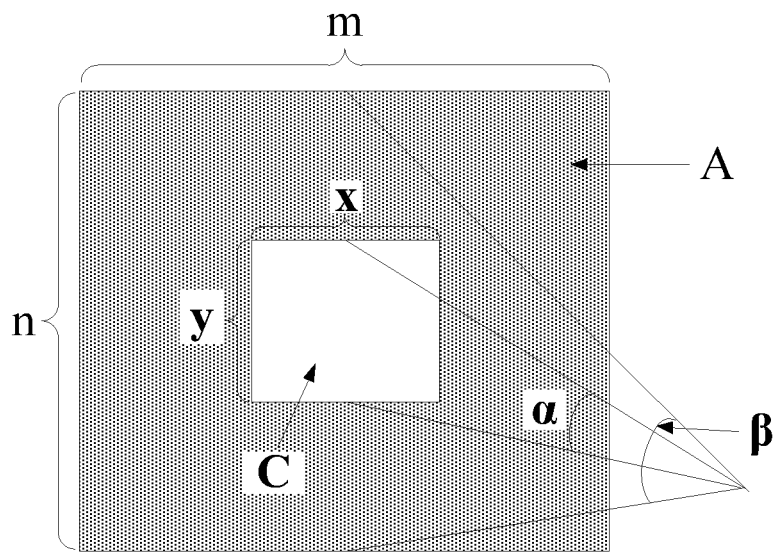
FIG. 3 is a schematic diagram of an image to be transmitted according to an embodiment of the present disclosure.

FIG. 3 is a schematic diagram of an image to be transmitted according to an embodiment of the present disclosure. As shown in FIG. 3, a resolution of the display area A is m×n. In the step S101, a portion of the image to be transmitted in the preset area is captured (e.g., cut out), for example, the portion in the area C in FIG. 3 is captured, to obtain a first image with a resolution of x×y. A definition of the obtained first image is the same as a definition of the portion of the image to be transmitted in the area C, such that the definition of the obtained first image is not changed, i.e., the first image is still a high definition image. Further, the data amount of the first image is smaller than the data amount of the image to be transmitted. The portion of the image to be transmitted in the display area is compressed to obtain the second image, and the data amount of the second image is smaller than that of the image to be transmitted because the second image is obtained by compressing the image to be transmitted. Further, a definition of the second image is smaller than that of the image to be transmitted.

Figure 4:
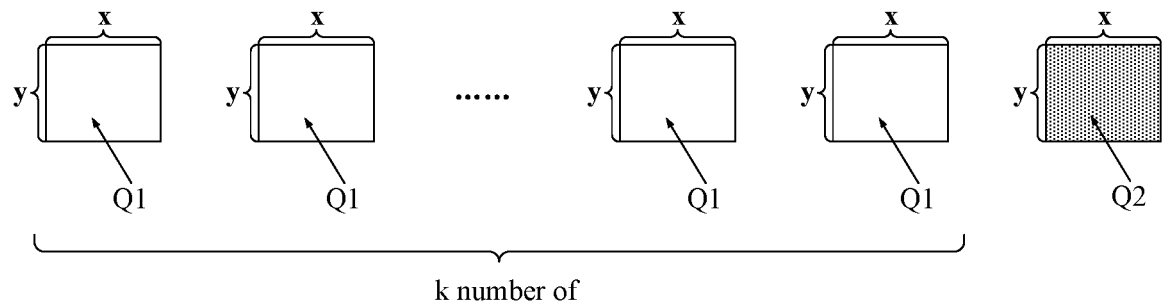
FIG. 4 is a first schematic diagram illustrating a transmission order (or transmission sequence) of a first image and a second image according to an embodiment of the present disclosure.
Figure 5:
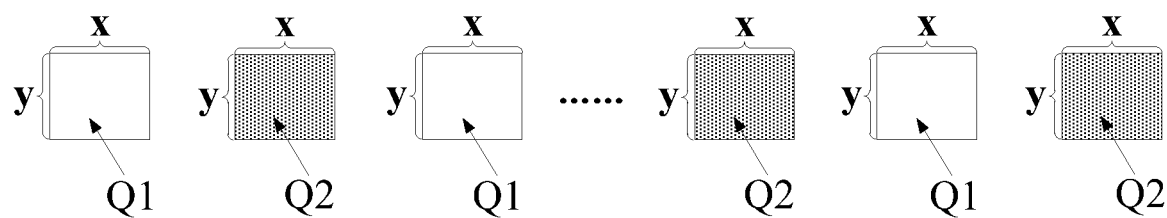
FIG. 5 is a second schematic diagram illustrating a transmission order of a first image and a second image according to an embodiment of the present disclosure.

In the step S102, the first image and the second image are transmitted to the virtual reality apparatus in a certain order. That is, in the transmission process, the first image and the second image are not transmitted simultaneously, and for example, the first image and the second image may be transmitted in the order as shown in FIG. 4 or FIG. 5. Since each of the data amount of the first image and the data amount of the second image is smaller than the data amount of the image to be transmitted, the transmission bandwidth is greatly reduced.

After receiving the first image and the second image, the virtual reality apparatus stretches the second image, and merges the stretched second image with the first image, to obtain an image to be displayed. In the image to be displayed, an area corresponding to the preset area is an image with a higher definition, and the remaining area is an image with a lower definition. In a specific implementation, when a user uses the virtual reality apparatus, eyes of the user mainly pay attention to a portion of a screen, for example, a central area of the screen, and when the user wants to watch the surrounding environment, the user mainly watches the surrounding environment by turning his head instead of turning his eyeballs. As such, the image to be displayed obtained in an embodiment of the present disclosure meets the requirement on the definition of an image. Further, the transmission bandwidth can be reduced, and a time delay in the image transmission process is reduced, thereby making the picture watched by the user smoother, and improving the user experience.

Specifically, in the data transmission method according to an embodiment of the present disclosure, the step S101 may include steps of:

referring to FIG. 3, performing image sampling on the preset area C of the image to be transmitted with a preset first resolution, a preset first field angle $\alpha$, and a preset first refresh rate r1 to obtain the first image. In a specific implementation, the preset area C may be a gazing area when the user watches the screen, for example, the preset area C may be a central area of the display area A;

performing image sampling on the display area A of the image to be transmitted with a preset second resolution, a preset second field angle $\beta$, and a preset second refresh rate r2 to obtain the second image;

where the first resolution and the second resolution are equal to each other (e.g., are each equal to x×y), the first field angle $\alpha$ is less than the second field angle $\beta$, and the first refresh rate r1 is greater than or equal to the second refresh rate r2.

During the sampling process, with reference to FIG. 3, through combining the first field angle $\alpha$ and the second field angle $\beta$, where the first field angle $\alpha$ may be a viewing angle at which the user views the preset area C, and the second field angle $\beta$ may be a viewing angle at which the user views the display area A, the image to be displayed obtained through subsequent merging by the virtual reality apparatus is more suitable for the viewing angle of the user, and the immersive experience can be realized. Since the first image corresponds to the user's gazing area and the second image corresponds to a peripheral area, the second refresh rate r2 may be less than the first refresh rate r1 to ensure that the user's gazing area has a higher definition.

Further, the first image and the second image have the same resolution, such that the resolution of each of the images in the transmission process is constant, and the fluency of the transmission process is ensured. For example, taking the resolution of the display area A as m×n and the first resolution as x×y as an example, if the image to be transmitted is directly transmitted, the transmission bandwidth thereof is m×n×r; in contrast, in the present embodiment, the transmission bandwidth for transmitting the first image and the second image is x×y×r, where r represents the refresh rate of the virtual reality apparatus; and it can be seen that the transmission bandwidth in the present embodiment is significantly reduced, where the compression ratio of the transmission bandwidth is (m×n)/(x×y). In addition, the sampling resolution of the first image and the sampling resolution of the second image are equal to each other, but a sampling area of the second image is larger than a sampling area of the first image, and thus the resultant first image has a higher definition than a definition of the resultant second image.

In a specific implementation, in the data transmission method according to each of the above embodiments of the present disclosure, the first refresh rate and the second refresh rate may be determined as follows:

determining the first refresh rate of the first image and the second refresh rate of the second image according to a refresh rate of the virtual reality apparatus and attitude information of the virtual reality apparatus.

In a specific implementation, a sensor such as a gyroscope is generally arranged in the virtual reality apparatus, the virtual reality apparatus may obtain the attitude information through the sensor such as the gyroscope, and determine whether the virtual reality apparatus is in a motion state or a static state according to the attitude information. For example, a corresponding threshold value may be set, if the attitude information is greater than the threshold value, the virtual reality apparatus is in the motion state, and if the attitude information is less than the threshold value, the virtual reality apparatus is in the static state. If the virtual reality apparatus is in the motion state, due to the motion blur of human eyes, the sensitivity of human eyes to the definition of a picture is reduced, and in this case, a proportion of the first image in an image sequence may be reduced, that is, the first refresh rate of the first image may be reduced, for example, the first image Q1 and the second image Q2 may be transmitted in an alternate manner as shown in FIG. 5, i.e., the first refresh rate may be equal to the second refresh rate. If the virtual reality apparatus is in the static state, since the sensitivity of human eyes to the definition of a picture is increased, the first refresh rate of the first image needs to be increased; in this case, the proportion of the first image in the image sequence needs to be increased, and for example, a periodical transmission may be performed in which k first images Q1 are transmitted continuously and then one second image Q2 is transmitted in the sequence as shown in FIG. 4, i.e., the first refresh rate is greater than the second refresh rate.

In a specific implementation, at least two transmission modes may be preset, for example, two transmission modes may be preset, in which a first transmission mode is applicable to the motion state, where the first refresh rate is equal to the second refresh rate, and a second transmission mode is applicable to the static state, where the first refresh rate is greater than the second refresh rate. Specific values of the first refresh rate and the second refresh rate in each transmission mode may be determined according to the refresh rate of the virtual reality apparatus. Alternatively, additional transmission modes may also be set, which is not limited herein. In a specific implementation, in step S101, the preset area may be sampled according to the determined first refresh rate to obtain the first image, and the display area may be sampled according to the second refresh rate to obtain the second image, such that the finally formed image to be displayed is more suitable for the current state of the user.

In a specific implementation, in the data transmission method according to each of the above embodiments of the present disclosure, the step S102 may include steps of:

arranging frames of the first image and the second image according to the first refresh rate and the second refresh rate to obtain an image sequence including the first image and the second image, and transmitting the image sequence to the virtual reality apparatus.

In a display process of the virtual reality apparatus, a picture displayed on a screen is constantly changed, and in order to ensure the continuity of the pictures displayed on the virtual reality apparatus, the virtual reality host needs to continuously transmit the first image and the second image to the virtual reality apparatus. Specifically, the frames of the first image and the second image may be arranged according to the refresh rate of the virtual reality apparatus, where a sum of the refresh rate of the first image and the refresh rate of the second image is the refresh rate of the virtual reality apparatus, i.e., r=r1+r2, r represents the refresh rate of the virtual reality apparatus, r1 represents the refresh rate of the first image, and r2 represents the refresh rate of the second image. For example, if the refresh rate of the virtual reality apparatus is 90 Hz, i.e., 90 refreshes per second, 9 frames of the first image and one frame of the second image may be transmitted periodically, where the refresh rate of the first image is 81 Hz and the refresh rate of the second image is 9 Hz. As shown in FIG. 4, a periodical transmission may be performed in which k first images Q1 are transmitted continuously and then one second images Q2 is transmitted in such a sequence. Alternatively, as shown in FIG. 5, the first images Q1 and the second images Q2 may be transmitted alternately.

In a specific implementation, a memory may be set in the virtual reality host to store the first image and the second image obtained in the step S101. For example, two memories may be set to store the first image and the second image, respectively, and a counter may be set in the virtual reality host. Taking that the refresh rate of the virtual reality apparatus is 90 Hz, and 9 frames of the first image and one frame of the second image are periodically transmitted in this order as an example, the virtual reality host may control the counter to count, read the memory addresses of the 9 frames of the first image at times 0 to 8, respectively, and sequentially transmit the frames of the first image, read the memory address of the one frame of the second image at time 9, and transmit the second image, and meanwhile, clear the counter, thereby completing transmission of the image sequence of one period.

In a specific implementation, in the data transmission method according to each of the above embodiments of the present disclosure, the step S101 may include a step of:

adding flag bit information into the first image and the second image, respectively, where the flag bit information is used for distinguishing the first image from the second image. For example, "a" number of data bits in the front of the first line of each of the first image and the second image may be set as flag data that serves as the flag information, or the flag bit information may be set at another position, which is not limited herein. Further, the flag information in the first image is different from the flag information in the second image, and thus the first image and the second image can be distinguished from each other by the flag information.

By adding the flag bit information into each of the first image and the second image, after receiving the image sequence, the virtual reality apparatus may identify the first image and the second image through the flag bit information, which is convenient for subsequent processing of the first image and the second image. In addition, in a specific implementation, a first memory and a second memory may be set in the virtual reality apparatus, and after identifying each image in the image sequence, the virtual reality apparatus may store the first image in the first memory, and store the second image in the second memory. Thus, in a subsequent process, the first image and the second image may be respectively obtained from the first memory and the second memory according to a corresponding sequence, thereby reducing a calculation amount in the subsequent process and avoiding omission of the first image or the second image.

Further, by setting the flag bit information in each of the first image and the second image, upon storing a new frame of image in the first memory and the second memory, the first memory and the second memory may discard the previous frame of image, and the first image and the second image stored in the first memory and the second memory are images required by the current frame. In this way, the first image and the second image can be directly obtained from the first memory and the second memory without considering the sequence of image frames, thereby reducing a data calculation amount.

Figure 6:
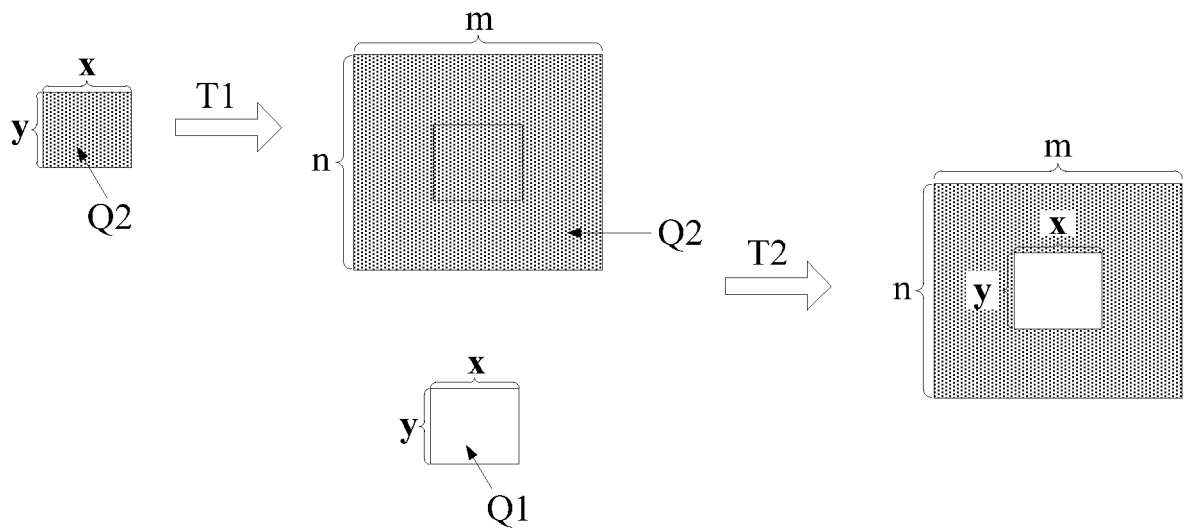
FIG. 6 is a schematic diagram illustrating a process of merging a first image with a second image by a virtual reality apparatus.

FIG. 6 is a schematic diagram illustrating a process of merging the first image with the second image by the virtual reality apparatus. As shown in FIG. 6, the virtual reality apparatus obtains the first image Q1 and the second image Q2 from the first memory and the second memory, respectively. The virtual reality apparatus stretches the second image Q2 in a process as shown by an arrow T1 in the figure, such that the resolution of the stretched second image Q2 is the same as a display resolution of the virtual reality apparatus, for example, the resolution of the second image Q2 is stretched from x×y to m×n as shown in the figure. As shown by an arrow T2 in the figure, The virtual reality apparatus merges the first image Q1 with the stretched second image Q2, by replacing the portion, which is shown by a dashed box, of the stretched second image Q2, that is, the first image Q1 is placed in a gazing area of the user, thereby obtaining an image to be displayed with a resolution of m×n through the merging. In addition, the image to be displayed may be processed by using a high definition fusion algorithm to blur a boundary between the first image and the second image.

Figure 7:
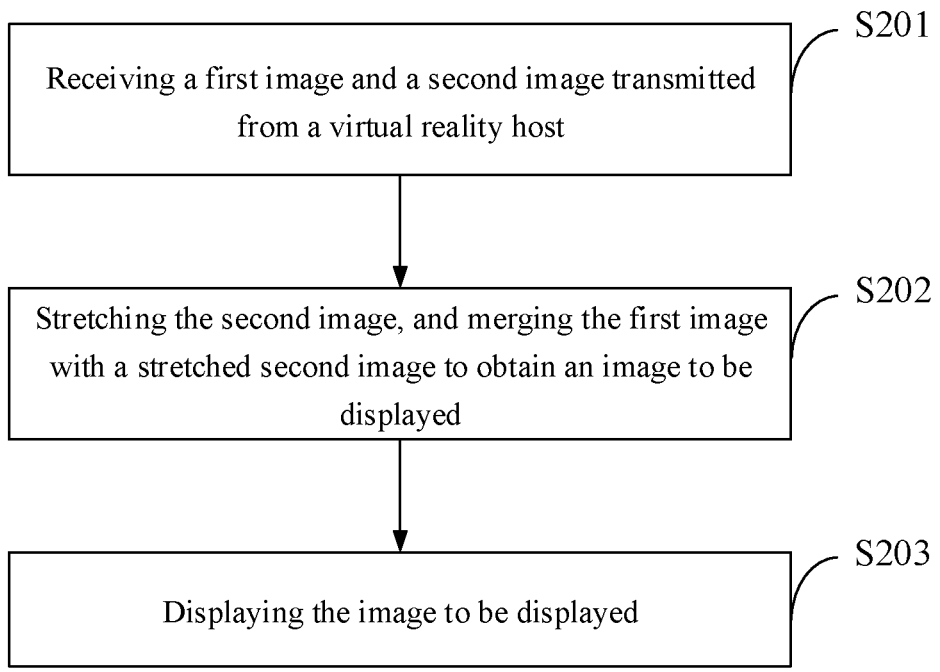
FIG. 7 is a third flowchart of a data transmission method for a virtual reality system according to an embodiment of the present disclosure.

Based on the same inventive concept, an embodiment of the present disclosure further provides a data transmission method for a virtual reality system, as shown in FIG. 7, the method may include the following steps S201 to S203.

Step S201 includes receiving a first image and a second image transmitted from a virtual reality host.

Step S202 includes stretching the second image, and merging the first image with the stretched second image to obtain an image to be displayed.

Step S203 includes displaying the image to be displayed.

In the data transmission method for the virtual reality system, the received first image is obtained by capturing the portion of the image to be transmitted in the preset area by the virtual reality host, and the received second image is obtained by compressing the portion of the image to be transmitted in the display area by the virtual reality host, such that the data amount of the first image and the data amount of the second image are both smaller than the data amount of the image to be transmitted, and the transmission bandwidth is greatly reduced. Moreover, the second image is stretched, and the stretched second image is merged (or fused) with the first image, such that the obtained image to be displayed can greatly reduce the transmission bandwidth and improve the user experience, on the basis of meeting the display requirement of a virtual reality system.

In an embodiment of the present disclosure, the data transmission method shown in FIG. 7 may be executed on the virtual reality apparatus.

Optionally, in the data transmission method according to the present embodiment, the step S201 may include steps of:
receiving the first image and the second image, and distinguishing the first image and the second image from each other according to the flag bit information; and
storing the first image in the first memory, and storing the second image in the second memory.

Since each of the first image and the second image is provided with the flag bit information, after receiving the first image and the second image, the virtual reality apparatus may identify the first image and the second image through the flag bit information, which is convenient to subsequent processing of the first image and the second image. In addition, in a specific implementation, the first memory and the second memory may be set in the virtual reality apparatus, and after identifying the images in an image sequence, the virtual reality apparatus may store the first image in the first memory, and store the second image in the second memory, such that in a subsequent process, the virtual reality apparatus may obtain the first image and the second image from the first memory and the second memory, respectively, according to a corresponding sequence, thereby reducing a calculation amount in the subsequent process and avoiding omission of the first image or the second image.

In a specific implementation, in the data transmission method according to the present embodiment, the step S202 may include steps of:
obtaining the first image and the second image from the first memory and the second memory, respectively;
referring to FIG. 6, in the process indicated by the arrow T1, stretching the second image Q2 to make the resolution of the stretched second image Q2 equal to the display resolution of the virtual reality apparatus, for example, the resolution of the second image Q2 is stretched from x×y to m×n as shown in the figure; and
merging the first image Q1 with the stretched second image Q2 to obtain an image to be displayed, as in a process indicated by the arrow T2; for example, replacing the portion, which is indicated by the dashed box in the figure, of the stretched second image Q2 with the first image Q1, i.e., placing the first image Q1 in the gazing area of the user, thereby obtaining the image to be displayed with the resolution of m×n through the merging.

In addition, the image to be displayed may be processed by using the high definition fusion algorithm to blur the boundary between the first image and the second image, and specifically, the image to be displayed may be processed in the following first to third manners.

The first manner is weighted averaging that includes: comparing the pixel values on both sides of the boundary between the first image and the second image, and carrying out weighted average on the pixel values on both sides of the boundary.

The second manner is edge diffusing that includes: multiplexing (e.g., reusing) the pixel values of the first image outwardly to extend the boundary between the first image and the second image outwardly, such that the boundary between the first image and the second image is outside the gazing area of human eyes, the boundary is invisible to the human eyes in the gazing area, and peripheral vision of the human eyes cannot capture the boundary clearly.

The third manner is gradient blurring (or gradually blurring) that includes carrying out gradient blurring on a portion of the first image close to the boundary to reduce a definition difference between both sides of the boundary, such that the first image and the second image have better fusion (or merging) effect at the boundary, and the human eyes cannot feel the existence of the boundary when watching.

Based on the same inventive concept, an embodiment of the present disclosure further provides a virtual reality host whose principle of solving a problem is similar to that of the data transmission method as described above, thus implementation of the virtual reality host may be referred to the implementation of the data transmission method, and repeated description thereof is omitted herein.

Figure 8:
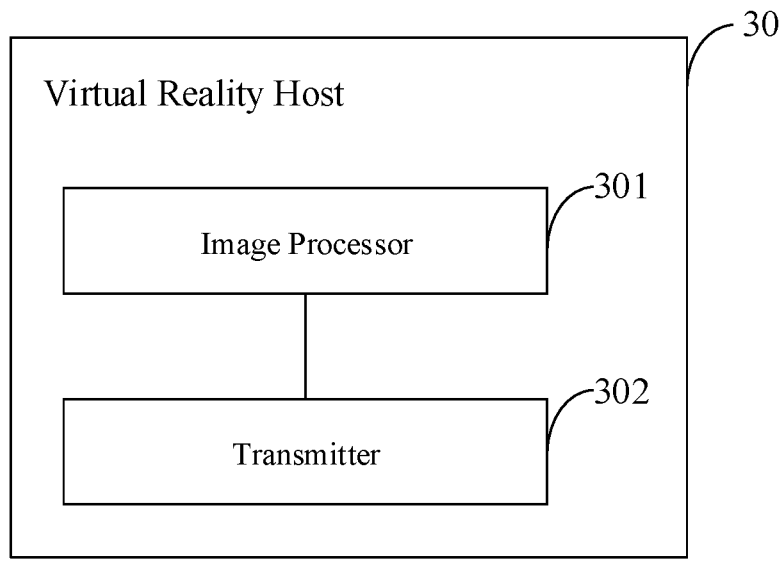
FIG. 8 is a schematic structural diagram of a virtual reality host according to an embodiment of the present disclosure.

FIG. 8 is a schematic structural diagram of a virtual reality host according to an embodiment of the present disclosure. As shown in FIG. 8, the virtual reality host 30 according to the present embodiment may include an image processor 301 and a transmitter 302.

The image processor 301 is configured to capture (e.g., cut out) the portion of the image to be transmitted in the preset area to obtain the first image, and compress the portion of the image to be transmitted in the display area to obtain the second image, where the preset area is a portion of the display area.

The transmitter 302 is configured to transmit the first image and the second image to a virtual reality apparatus in a certain order.

Optionally, in the virtual reality host according to the present embodiment, the image processor 301 is specifically configured to: perform image sampling on the preset area of the image to be transmitted with the preset first resolution, the preset first field angle, and the preset first refresh rate to obtain the first image, and perform image sampling on the display area of the image to be transmitted with the preset second resolution, the preset second field angle, and the preset second refresh rate to obtain the second image, where the first resolution and the second resolution are equal to each other, and the first refresh rate is greater than or equal to the second refresh rate.

Optionally, in the virtual reality host according to the present embodiment, the transmitter 302 is specifically configured to: determine the first refresh rate of the first image and the second refresh rate of the second image according to the refresh rate of the virtual reality apparatus and the attitude information of the virtual reality apparatus; arrange frames of the first image and the second image according to the first refresh rate and the second refresh rate to obtain an image sequence including the first image and the second image; and transmit the image sequence to the virtual reality apparatus.

Optionally, in the virtual reality host according to the present embodiment, the image processor 301 is further configured to: add flag bit information into the first image and the second image, respectively, where the flag bit information is used for distinguishing the first image and the second image from each other.

Based on the same inventive concept, an embodiment of the present disclosure further provides a virtual reality apparatus whose principle of solving a problem is similar to that of the data transmission method as described above, thus an implementation of the virtual reality apparatus may be referred to the implementation of the data transmission method, and repeated description thereof is omitted herein.

Figure 9:
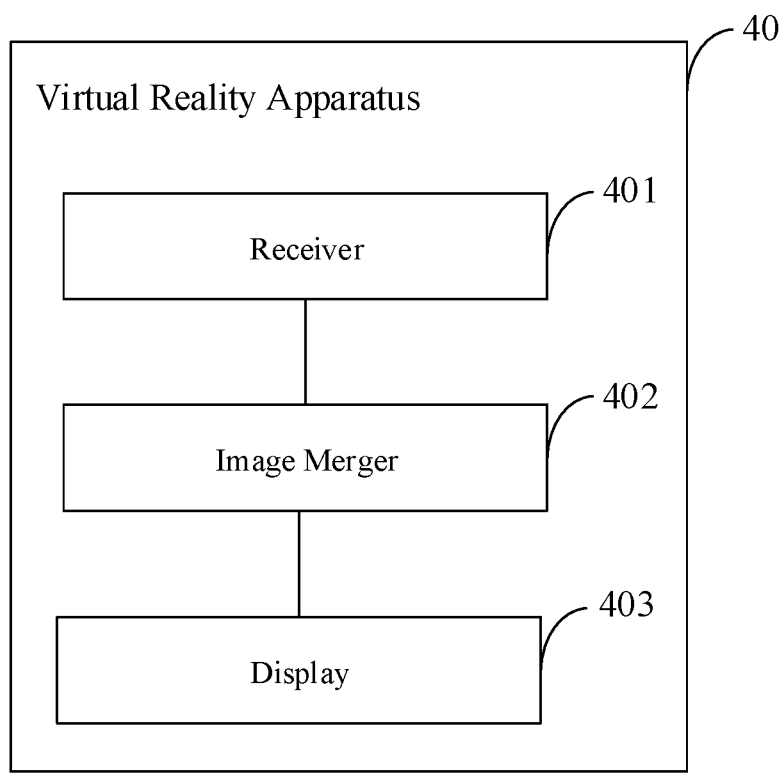
FIG. 9 is a schematic structural diagram of a virtual reality apparatus according to an embodiment of the present disclosure.

FIG. 9 is a schematic structural diagram of a virtual reality apparatus according to an embodiment of the present disclosure. As shown in FIG. 9, the virtual reality apparatus 40 according to the present embodiment may include a receiver 401, an image merger 402, and a display 403.

The receiver 401 is configured to receive the first image and the second image transmitted from the virtual reality host.

The image merger 402 is configured to stretch the second image, and merge the first image with the stretched second image to obtain the image to be displayed.

The display 403 is configured to display the image to be displayed.

Optionally, in the virtual reality apparatus according to the present embodiment, the receiver 401 is specifically configured to: receive the first image and the second image, and distinguish the first image and the second image from each other according to the flag bit information, store the first image in the first memory, and store the second image in the second memory.

Optionally, in the virtual reality apparatus according to the present embodiment, the image merger 402 is specifically configured to: obtain the first image and the second image from the first memory and the second memory, respectively; stretch the second image to make the resolution of the stretched second image equal to the display resolution of the virtual reality apparatus; and merge the first image with the stretched second image to obtain the image to be displayed.

Based on the same inventive concept, an embodiment of the present disclosure further provides a virtual reality system whose principle of solving a problem is similar to those of the virtual reality host and the virtual reality apparatus, thus an implementation of the virtual reality system may be referred to the implementation of the virtual reality host and the implementation of the virtual reality apparatus, and repeated description thereof is omitted herein.

Figure 10:
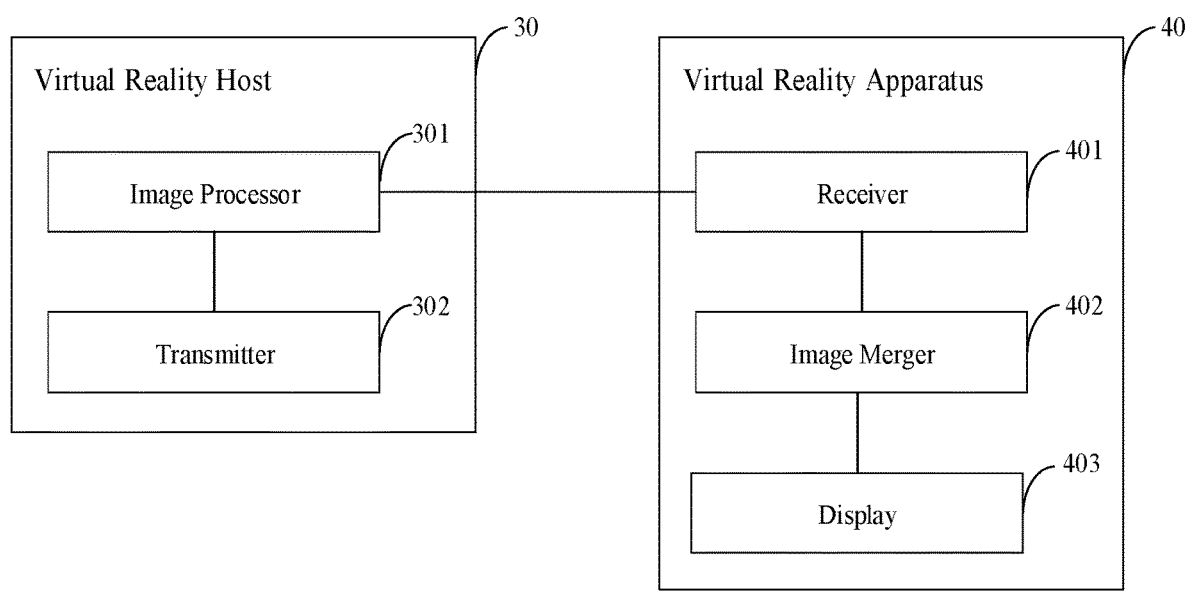
FIG. 10 is a schematic structural diagram of a virtual reality system according to an embodiment of the present disclosure.

FIG. 10 is a schematic structural diagram of a virtual reality system according to an embodiment of the present disclosure. As shown in FIG. 10, the virtual reality system according to the present embodiment may include any one of the virtual reality hosts 30 described above and any one of the virtual reality apparatuses 40 described above.

In the data transmission method and the related devices for the virtual reality system according to the embodiments of the present disclosure, the first image is obtained by capturing the portion of the image to be transmitted in the preset area, the portion of the image to be transmitted in the display area is compressed to obtain the second image, and the first image and the second image are transmitted in the certain order. Since the data amount of the first image and the data amount of the second image are both smaller than the data amount of the image to be transmitted, the transmission bandwidth is greatly reduced. Further, the virtual reality apparatus can stretch the received second image, merge the stretched second image with the received first image, and the resultant image to be displayed can meet the display requirement of the virtual reality system, such that the data transmission method according to each of the embodiments of the present disclosure can greatly reduce the transmission bandwidth and improve the user experience on the basis of meeting the display requirement of the virtual reality system.

It will be apparent to those skilled in the art that various changes and modifications may be made to the present disclosure without departing from the spirit and scope of the present disclosure. Thus, it is intended that the present disclosure also encompass such changes and modifications if they fall within the scope of the appended claims and their equivalents.

What is claimed is:

1. A data transmission method for a virtual reality system, the data transmission method comprising:
   capturing a portion of an image to be transmitted in a preset area by performing image sampling on the preset area of the image to be transmitted with a preset first resolution, a preset first field angle and a preset first refresh rate to obtain a first image, and compressing a portion of the image to be transmitted in a display area by performing image sampling on the display area of the image to be transmitted with a preset second resolution, a preset second field angle and a preset second refresh rate to obtain a second image, wherein the preset area is a portion of the display area;
   transmitting the first image and the second image to a virtual reality apparatus in a certain order;
   receiving the first image and the second image by the virtual reality apparatus;
   stretching the second image by the virtual reality apparatus, and merging the first image with a stretched second image by the virtual reality apparatus to obtain an image to be displayed; and
   displaying the image to be displayed by the virtual reality apparatus,
   wherein the first resolution and the second resolution are equal to each other, the first field angle is less than the second field angle, and the first refresh rate is greater than or equal to the second refresh rate.

2. A data transmission method for a virtual reality system, the data transmission method comprising:
   receiving a first image and a second image;
   stretching the second image, and merging the first image with a stretched second image to obtain an image to be displayed; and
   displaying the image to be displayed;
   the data transmission method further comprises, prior to the receiving the first image and the second image:
   capturing a portion of an image to be transmitted in a preset area to obtain the first image, and compressing a portion of the image to be transmitted in a display area to obtain the second image, wherein the preset area is a portion of the display area; and
   transmitting the first image and the second image to a virtual reality apparatus in a certain order; and
   wherein the capturing the portion of the image to be transmitted in the preset area to obtain the first image and the compressing the image to be transmitted to obtain the second image comprise:
   performing image sampling on the preset area of the image to be transmitted with a preset first resolution, a preset first field angle and a preset first refresh rate to obtain the first image; and
   performing image sampling on the display area of the image to be transmitted with a preset second resolution, a preset second field angle and a preset second refresh rate to obtain the second image;
   wherein the first resolution and the second resolution are equal to each other, the first field angle is less than the second field angle, and the first refresh rate is greater than or equal to the second refresh rate.

3. The data transmission method according to claim 2, wherein the receiving the first image and the second image comprises:
   receiving the first image and the second image, and distinguishing the first image and the second image from each other according to flag bit information; and
   storing the first image in a first memory, and storing the second image in a second memory.

4. The data transmission method according to claim 3, wherein the stretching the second image, and the merging the first image with the stretched second image to obtain the image to be displayed comprise:
   obtaining the first image and the second image from the first memory and the second memory, respectively;
   stretching the second image to make a resolution of the stretched second image equal to a display resolution of the virtual reality apparatus; and
   merging the first image with the stretched second image to obtain the image to be displayed.

5. The data transmission method according to claim 2, wherein the first refresh rate and the second refresh rate are determined as follows:
   the first refresh rate of the first image and the second refresh rate of the second image are determined according to a refresh rate of the virtual reality apparatus and attitude information of the virtual reality apparatus.

6. The data transmission method according to claim 2, wherein the transmitting the first image and the second image to the virtual reality apparatus in the certain order comprises:
   arranging frames of the first image and the second image according to the first refresh rate and the second refresh rate to obtain an image sequence comprising the first image and the second image, and transmitting the image sequence to the virtual reality apparatus.

7. The data transmission method according to claim 2, wherein the capturing the portion of the image to be transmitted in the preset area to obtain the first image, and the compressing the portion of the image to be transmitted in the display area to obtain the second image comprise:
   adding flag bit information into the first image and the second image, respectively, wherein the flag information is configured to distinguish the first image and the second image from each other.

8. A virtual reality apparatus, comprising:
   a receiver configured to receive a first image and a second image transmitted from a virtual reality host;
   an image merger configured to stretch the second image, and merge the first image with a stretched second image to obtain an image to be displayed; and
   a display configured to display the image to be displayed,
   wherein the virtual reality host comprises:
   an image processor configured to capture a portion of an image to be transmitted in a preset area to obtain a first image, and compress a portion of the image to be transmitted in a display area to obtain a second image, wherein the preset area is a portion of the display area; and
   a transmitter configured to transmit the first image and the second image to the virtual reality apparatus in a certain order; and
   wherein the image processor is further configured to:
   perform image sampling on the preset area of the image to be transmitted with a preset first resolution, a preset first field angle and a preset first refresh rate to obtain the first image; and perform image sampling on the display area of the image to be transmitted with a preset second resolution, a preset second field angle and a preset second refresh rate to obtain the second image;
   wherein the first resolution and the second resolution are equal to each other, and the first refresh rate is greater than or equal to the second refresh rate.

9. The virtual reality apparatus according to claim 8, wherein the receiver is further configured to: receive the first image and the second image, distinguish the first image and the second image from each other according to flag bit information; store the first image in a first memory; and store the second image in a second memory.

10. The virtual reality apparatus according to claim 9, wherein the image merger is further configured to: obtain the first image and the second image from the first memory and the second memory, respectively; stretch the second image to make a resolution of the stretched second image equal to a display resolution of the virtual reality apparatus; and merge the first image with the stretched second image to obtain the image to be displayed.

11. A virtual reality system, comprising: the virtual reality apparatus according to claim 8 and the virtual reality host.

12. The virtual reality apparatus according to claim 8, wherein the virtual reality host is in communication connection with the virtual reality apparatus in a wired or wireless manner.

13. The virtual reality apparatus according to claim 8, wherein the transmitter is further configured to: determine the first refresh rate of the first image and the second refresh rate of the second image according to a refresh rate of the virtual reality apparatus and attitude information of the virtual reality apparatus; arranging frames of the first image and the second image according to the first refresh rate and the second refresh rate to obtain an image sequence comprising the first image and the second image; and transmit the image sequence to the virtual reality apparatus.

\* \* \* \* \*